Dec. 28, 1965
C. H. SNYDER
3,225,461
PREPRINTED HOLLOW RELIEF GLOBE, METHOD
OF MAKING IT AND APPARATUS THEREFOR
Filed Dec. 7, 1960
2 Sheets-Sheet 1
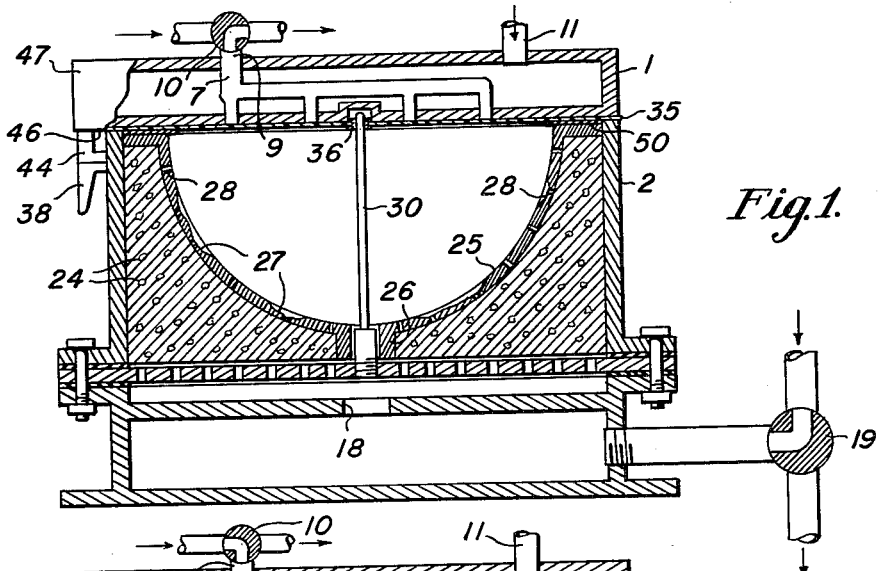
Fig. 1.
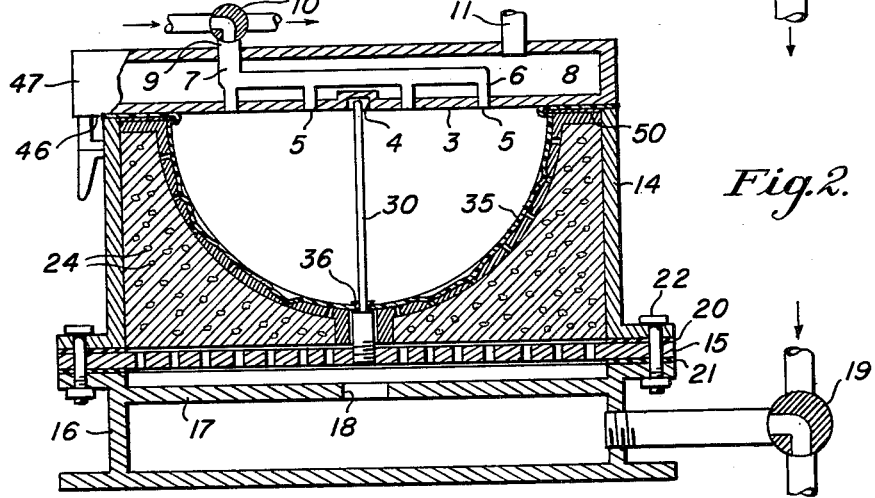
Fig. 2.
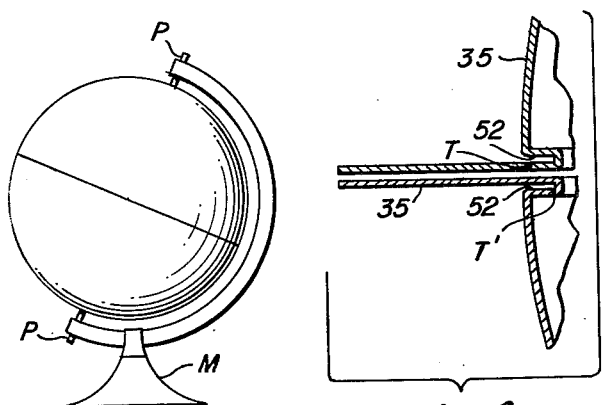
Fig. 8.   Fig. 6.
Fig. 7.
INVENTOR.
CHARLES H. SNYDER
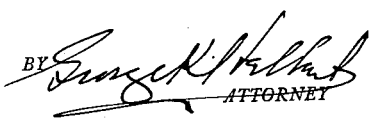
ATTORNEY Dec. 28, 1965 C. H. SNYDER 3,225,461
PREPRINTED HOLLOW RELIEF GLOBE, METHOD
OF MAKING IT AND APPARATUS THEREFOR
Filed Dec. 7, 1960 2 Sheets-Sheet 2

INVENTOR.
CHARLES H. SNYDER

BY ATTORNEY

United States Patent Office 3,225,461
Patented Dec. 28, 1965

3,225,461
PREPRINTED HOLLOW RELIEF GLOBE, METHOD OF MAKING IT AND APPARATUS THEREFOR
Charles H. Snyder, Philadelphia, Pa., assignor, by mesne assignments, to Aero Service Incorporated, a corporation of Delaware
Filed Dec. 7, 1960, Ser. No. 74,263
1 Claim. (Cl. 35—46)

This invention relates to globes, normally terrestrial ones, having the land masses in relief on their generally spherical outer surfaces suitably colored to designate political subdivisions or the like with printed matter giving the names of countries, rivers, mountains, bodies of water and so forth in the customary way together with lines corresponding to parallels and meridians of latitude and longitude.

In the production of such globes it has been the practice to print flat maps in generally circular segments on thin paper or the like in suitable cartographic projection respectively representing corresponding spherical segments of the Northern and Southern Hemispheres and to then glue them respectively to hemispherical forms previously prepared, for example, from pulp board having built-up projections on their outer surfaces roughly corresponding to the topography of land masses but these globes are inaccurate, give distorted impressions of the relative character and location of geographical developments depicted and are extremely costly because of the large amount of skilled hand labor required in their manufacture.

Hence efforts have been made to produce relief globes by molding or otherwise distorting to generally hemispherical form flat sheets of thermoplastic synthetic resins and like materials but it has been necessary before or after the molded parts are secured together to apply all the informational material not evident from mere contour differences yet without which globes are comparatively worthless for instruction or other useful purpose.

It is therefore a principal object of the invention to provide a relief globe constituting a scaled replica of a planet or the like, specifically a terrestrial globe, formed by appropriately molding or otherwise distorting to substantially hemispherical form flat sheets of thermoplastic or other suitable material upon which have been printed all the information which it is desired to have appear on the globe such as names of countries, land masses, bodies of water, parallels of latitude and longitude, name of places and the like, and then securing two of these molded preprinted parts together to form the finished globe.

Other objects, purposes and advantages of the invention will be hereinafter more fully set forth or will be understood from the following description in which reference will be had to the accompanying drawings illustrating apparatus with the aid of which a typical terrestrial hemisphere may be produced wherein:

FIG. 1 is a diagrammatic transverse section of said apparatus including a plastic sheet prior to forming;

FIG. 2 is a like view thereof showing the plastic sheet after formation into a substantially hollow hemispherical replica of one hemisphere of the earth;

FIG. 6 is a composite fragmentary enlarged section of opposed edge portions of formed complementary hemispheres preparatory to being interlocked;

FIG. 7 is a like fragmentary view of the hemispheres after being interlocked;

FIG. 8 is a diagrammatic side view on reduced scale of a mounted globe, and

Figure 3:
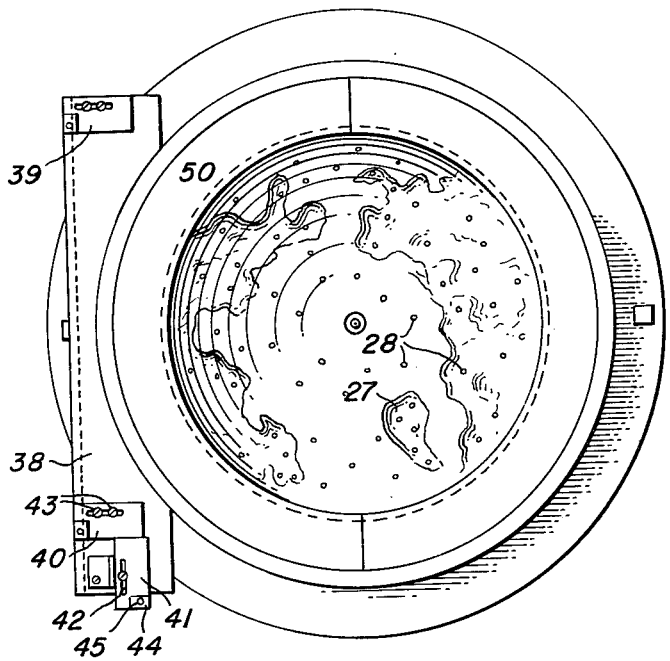
FIG. 3 is a top plan view of one of the mold parts illustrated in the preceding figures.

Referring now more particularly to the drawings the apparatus shown in FIGS. 1–3 has cooperative units generally comprising a mold cover 1 and a concave mold 2 and fixtures hereinafter more fully described for insuring proper registry between them when brought together in operative relationship. The cover 1 has a plane under surface 3 interrupted at its center by a small cavity or recess 4 and by a plurality of ports 5 from which tubes 6, 7 extend through a hollow interior chamber 8 in the cover to its upper face provided with a branched connection 9, whereby vacuum and air under pressure may be applied selectively under the control of a suitable 3-way or other valve 10 while a conduit 11 is connected with the interior of the chamber for the conductors of an electric heating element therein (not shown) although other heating means may be employed if desired.

The concave mold 2 comprises in effect a substantially cylindrical outer flask 14 outwardly flanged at its lower end and of depth overall about equal to or preferably somewhat greater than its radius and a perforated "false bottom" plate 15, which in turn rests on a hollow outwardly flange box 16 having a top 17 providing an axial port 18 and at its side a threaded pipe connection for communication with means whereby through operation of 3-way valve 19 the pressure in the box may be controlled at will. Gaskets 20, 21 and nut and bolt fasteners 22 seal plate 15 and the flanges on the flask and the box together in air-tight relation while within the flask above plate 15 there is disposed a mass of highly porous material of considerable physical strength and rigidity but of such character as to be readily permeable to air, an aggregate of coarse slag particles 24 coated with epoxy resin glue or the like being quite suitable.

This material is introduced into the flask in a plastic state to fill the space between the walls of the flask and a preformed concave hemispherical liner 25, made as hereinafter more fully described, and as the resin sets it becomes a hard highly porous solid affording a rigid but permeable support to the liner. To make the latter a substantially hemispherical form is used to which after coating with a suitable parting compound pieces of epoxy-resin-impregnated fiber glass cloth are applied in successive layers to a thickness of about ¼", an integral polar bushing 26 of substantially greater radial thickness also being formed thereon to support the liner above the flask bottom when disposed therein. The epoxy resin impregnating the glass cloth is compounded to set within a reasonable time to a non-sticky relatively hard composition and after it has so set the liner is assembled with the inverted flask and the epoxy coated slag packed loosely around it and in turn allowed to set. The inner liner is then carved or otherwise formed by means of suitable hand or mechanical burrs, routing tools or the like to reproduce in its concave hemispherical surface contoured depressions 27 scaled to land masses of the planetary hemisphere to which it is to correspond and be complementary thereto. Further to permit passage of air the liner is perforated by a large number of minute radial holes 28 symmetrically distributed over its surface in concentric circles and extending into the coated slag aggregate until each communicates with at least one occluded space having communication through the aggregate with at least one hole in the false bottom plate 15 of the flask as for best results it is essential that each hole in the liner be capable of evacuating its share of the air in the mold to box 16.

To insure exact maintenance of the sheet in properly centered position with relation to the mold during the molding operation, a polar guide 30 is threaded into plate 15 to extend upwardly in coincidence with the axis of the hemispherical cavity in the mold into cavity 4 in the cover.

Preparatory to forming a plastic sheet 35 in the mold just described it is printed with lines defining land masses from adjacent oceans and other large bodies of water and the like, these lines, however, being so disposed as to coincide after the molding with the edges of the depressions in the intaglio in the liner of the mold which in turn define the land from the water. Similarly lines showing the courses of rivers, parallels and meridians, political subdivisions and the like may be imprinted on the flat sheet and parts of the latter variously colored as desired, with names of countries, oceans and so forth also applied by printing or otherwise appropriately distorted as necessary to compensate for the increased superficial area of the hemisphere subsequently formed from the flat sheet. Furthermore, for cooperation with polar guide 30 a grommet 36 may be placed at the center of the sheet corresponding in location to the pole of the hemisphere when terrestrial Northern and Southern Hemispheres are being made or the sheet may merely be drilled at that point. The function of this grommet or hole in connection with the formation of a hemisphere from the sheet will hereinafter more fully appear.

Reference has been made to registering mechanism for assuring proper alignment of the mold parts when they are brought together, said mechanism, more specifically, including an elongated plate 38 fixed to the flask in horizontal position carrying spaced smaller plates 39, 40, 41 having slots 42 receiving headed screws 43 threaded into plate 38 whereby they may be adjusted horizontally relative to the latter and each smaller plate carries a boss 44 from which a pin 45 projects upwardly for reception in a corresponding hole (not shown) in the under surface 46 of an extension 47 of the mold cover, whereby positioning of the latter is adjustably controlled to insure its registry with the flask.

The flask, moreover, is provided with a split ring 50 defining a circle coaxial with its hemispherical mold cavity but of slightly less diameter designed to be placed on the mold with its inner edge projecting inwardly a little beyond the edge of the cavity for a purpose which will hereafter appear.

Figure 4:
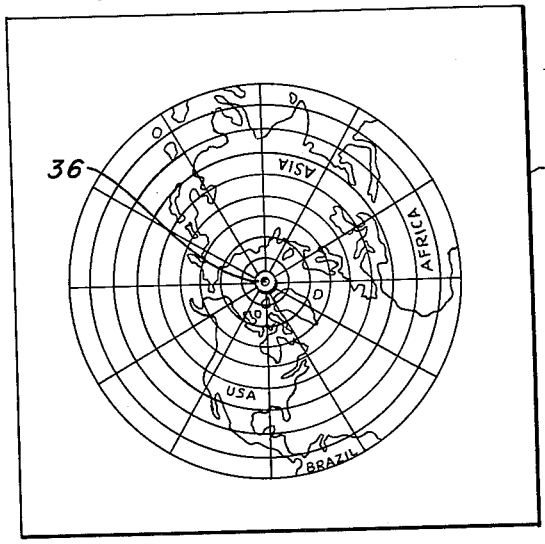
FIG. 4 is a plan view of the sheet prepared for forming into a hemisphere with the aid of said apparatus.
Figure 9:
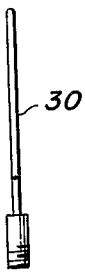
FIG. 9 is an elevation of the polar guide apart from said apparatus.
Figure 5:
FIG. 5 is a side elevation of the said sheet after being so formed.

To make a hollow hemispherical replica of a terrestrial hemisphere with the aid of the apparatus just described a sheet 35 of thermoplastic or thermosetting material properly printed in the manner heretofore explained (FIG. 4) is positioned printed matter down on the flask over ring 50, the cover of course being removed during this operation with the polar guide projecting through the central hole or grommet in the sheet to hold the sheet in centered relation with the mold. The cover is then brought into place and clamped securely to the flask by any suitable means (not shown), the upwardly projecting end of the guide being received in its recess 4, and while the cover is heated by passing electric current through its heating element the sheet is drawn into intimate contact with its under surface 3 by vacuum applied through pipe connection 9, while positive air pressure is applied to the under side of the sheet by manipulation of valve 19. When the sheet has been heated sufficiently, usually after only a very short time if the cover is hot when lowered on to the flask, the suction through connection 9 is suddenly discontinued and air under pressure simultaneously applied through said connection while vacuum is applied to the lower face of the sheet again by manipulation of valve 19. The resulting pressure differential on its opposite faces forces the heated sheet rapidly into the mold cavity and as it descends the hole or grommet at its center slides down the polar guide to the full extent of its travel. The sheet at the upper edge of the mold cavity is moreover forced over and beneath the edge of ring 50 and is thus formed by the ring to provide a groove 52 at the equatorial edge of its hemispherical portion while the latter is forced into all the depressions 27 in the mold and thus made to conform exactly thereto, the surface distortion resulting from this movement of the sheet compensating for the initial distortion of the printed matter on it which thus appears without objectionable distortion on the finished hemisphere.

After the hemisphere has been thus formed the mold cover is taken off and the sheet allowed to cool while vacuum is maintained in box 16 until rigidity is attained. Ring 50 is then removed with the molded sheet, which can be forced out of the mold by air introduced through the box if desired and the ring halves are separated and removed from groove 52. Assuming a complementary hemisphere representing the other hemisphere of the globe has been formed in another mold by like procedure, both are prepared for joining by trimming off their peripheral portions, one near the outer edge of its equatorial groove and the other near the inner edge of its corresponding groove, the lines of severance being indicated respectively at T and T' in FIG. 6 leaving one hemisphere with an equatorial groove G and the other with an inwardly directed equatorial flange F. The hemispheres are sufficiently yielding to enable flange F to be sprung into groove G all the way around the globe, thus forming a permanent connection between the hemispheres as shown in FIG. 7. There remains but to provide an appropriate mounting M comprising, conveniently, a meridian ring or segment carrying short pins P for entry into the polar apertures or grommets 36 of both hemispheres to support the globe for use and study, no effort having been made, on account of scale problems, to show actual contour details or applied data in the FIG. 8 view of the finished globe. By reason of the resiliency of the globe it may be readily detached from the mounting, when desired, by manually compressing it adjacent the poles sufficiently to clear it from the pins.

More specifically, for making globes in accordance with the invention I prefer to employ sheets of thermoplastic materials such as "Plexiglas G" or "Plexiglas #2" acrylic resin as marketed by Rohm & Haas Co., Philadelphia, Pa., or pressed, planished or calendered polyvinyl chloride VSA–3603 as marketed by Union Carbide Plastics Co., Bound Brook, N.J., or sheets of thermosetting materials such as "Daxene" marketed by Dewey & Almy Chemical Co., Cambridge, Mass. The color is of course a matter of choice and clear plastic sheets also may be used; when making a globe of nominal 12" diameter I prefer to use sheets about 16" square close to but not greater than .050" in thickness for acrylic resin and from .040" to .060" thick for polyvinyl chloride. For best results I have found that when using calendered or extruded material, it is preferable to laminate a plurality of thin sheets together to produce a moldable sheet approximating the final thickness just mentioned. In this way strains in the individual sheets can be compensated by arranging the sheets in such manner that the stress grain in one sheet will be angularly disposed to that in the adjacent sheet or sheets and thus approximating equality in the strain factors in the individual sheets comprising the final laminated moldable product, equality of strain factors being required to assure registration between the preprinted indicia and the ultimate relief image. A further advantage of this procedure resides in the fact that the sheet which is to form the outer face of the laminated sheet, and thus of the globe, may be of high gloss, matte or other desired finish. This outermost sheet or layer may serve merely as a protective covering for the subjacent printed sheet or, if preferred, the printing may be done upon the back or under surface of the outer sheet which, in all cases, is transparent.

The mold cover is desirably heated to about 270° F. for these materials and a pressure difference of about one atmosphere maintained on opposite sides of the sheet to press the latter against the cover while the sheet is being heated. After it has attained the desired plasticity the pressure differential in reverse direction is considerably greater, air under pressure of approximately 130 p.s.i. being introduced through the cover while the box is evacuated to a negative pressure of about one atmosphere. Using these values the sheet can be formed satisfactorily in a very brief time, of the order of a few seconds; this is of considerable importance in minimizing distortion other than that anticipated in designing the pattern applied to the sheet for conversion by the anticipated distortion into actual undistorted geographical boundaries and other data.

It will of course be understood that while reference herein is primarily to terrestrial globes the invention is not limited to globes depicting the terrain found on the planet earth, as if desired by comparable means and methods, the necessary geographical information being available, globes representing the moon, planets or other substantially spherical celestial bodies may be produced as well.

While I have thus described the invention in considerable detail it will be understood I do not desire thereby to be limited or confined in any way as changes in operating procedures, in the form, construction and operative relationship of the parts of the apparatus employed and in the specific structure of my novel globe will readily occur to those skilled in the art and may be made if desired without departing from the spirit and scope of the invention as defined in the appended claim.

Having thus described my invention, I claim and desire to protect by Letters Patent of the United States:

A two-part 3-dimensional substantially spherical map comprising a complementary pair of substantially hemispherical unitary one-piece parts of plastic sheet material of substantially uniform thickness throughout, each having projecting portions corresponding to land masses and adjacent spherical portions corresponding to water masses, one of said parts having a radially outwardly opening continuous parallel sided equatorial groove and the other of said parts having a radially inwardly projecting substantially flat continuous equatorial flange seated in said groove and cooperative therewith to form a joint to hold the parts together, each part being apertured coaxial with its spherical surface for receiving an element for supporting the map for rotation about its axis, each of said parts comprising a laminated assembly of at least two unitary plastic sheets including at least one transparent sheet, each sheet having its stress grain disposed at an angle with respect to the stress grain of an adjacent sheet, printed indicia designating features of the map carried by a face of one of the sheets and juxtaposed against the face of another sheet, said indicia being visible through said transparent sheet of the assembly, said sheets being free of gore lines.

References Cited by the Examiner

UNITED STATES PATENTS

| | | | |
|---|---|---|---|
| 930,316 | 8/1909 | Rehm | 35—46 |
| 1,112,294 | 9/1914 | Kepler | 18—59 |
| 1,422,642 | 7/1922 | Walters | 35—46 |
| 1,812,110 | 6/1931 | Meyerhoff | 35—46 |
| 1,926,787 | 9/1933 | Ohno | 35—46 |
| 2,067,025 | 1/1937 | Schmidt | 151—55 |
| 2,372,177 | 3/1945 | Conner | 161—55 |
| 2,877,570 | 3/1959 | Starworth | 35—46 |
| 2,911,677 | 11/1959 | Weber | 18—19 |
| 2,926,385 | 3/1960 | Willson | 18—19 |
| 3,010,152 | 11/1961 | Braund | 35—46 X |
| 3,077,040 | 2/1963 | Stieber et al. | 35—46 |

EUGENE R. CAPOZIO, *Primary Examiner.*

PHILIP ARNOLD, LEO SMILOW, JEROME SCHNALL, *Examiners.*

JAMES PEKAR, BENJAMIN SKLAR, HARLAND S. SKOGQUIST, *Assistant Examiners.*